(12) United States Patent
Takahashi et al.

(10) Patent No.: US 9,092,049 B2
(45) Date of Patent: Jul. 28, 2015

(54) IMAGING APPARATUS AND WIRELESS SYSTEM

(71) Applicant: OLYMPUS CORPORATION, Tokyo (JP)

(72) Inventors: Tetsuyuki Takahashi, Tokyo (JP); Kiyoshi Toyoda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/105,924

(22) Filed: Dec. 13, 2013

(65) Prior Publication Data

US 2014/0104443 A1   Apr. 17, 2014

Related U.S. Application Data

(63) Continuation of application No. PCT/JP2012/064750, filed on Jun. 8, 2012.

(30) Foreign Application Priority Data

Jun. 24, 2011   (JP) .................. 2011-140830

(51) Int. Cl.
*H04N 5/225* (2006.01)
*G06F 3/00* (2006.01)
(Continued)

(52) U.S. Cl.
CPC . *G06F 3/005* (2013.01); *G01S 3/14* (2013.01); *H04N 1/00127* (2013.01); *H04N 1/00347* (2013.01); *H04N 5/23293* (2013.01); *H04N 2101/00* (2013.01); *H04N 2201/0015* (2013.01); *H04N 2201/0044* (2013.01);
(Continued)

(58) Field of Classification Search
CPC .................. H04N 2102/00; H04N 2201/0055; H04N 2201/0086; H04N 2201/0044

USPC ................. 348/207.1; 455/13.3, 19, 25, 63.4, 455/127.2, 129
See application file for complete search history.

(56) References Cited

U.S. PATENT DOCUMENTS 6,628,899 B1 *   9/2003   Kito ................................ 396/56
7,324,471 B2 *   1/2008   Kim .............................. 370/320
(Continued)

FOREIGN PATENT DOCUMENTS

JP   2002-218503 A   8/2002
JP      3441422 B2   9/2003
(Continued)

OTHER PUBLICATIONS

International Search Report, dated Jul. 10, 2012, issued in corresponding application No. PCT/JP2012/064750.
(Continued)

*Primary Examiner* — Aung S Moe
*Assistant Examiner* — Amy Hsu
(74) *Attorney, Agent, or Firm* — Westerman, Hattori, Daniels & Adrian, LLP

(57) ABSTRACT

An imaging apparatus includes an imaging unit, a display unit, an antenna, an antenna control unit, a wireless unit, a reception strength detection unit, an identification information extraction unit, a recording control unit, a recording unit, a relative angle extraction unit, an estimated position calculation unit, a display control unit, an instruction input detection unit, and a wireless connection switching control unit.

4 Claims, 8 Drawing Sheets

(51) Int. Cl.
*H04N 1/00* (2006.01)
*H04N 5/232* (2006.01)
*G01S 3/14* (2006.01)
*H04N 101/00* (2006.01)

(52) U.S. Cl.
CPC ............... *H04N 2201/0055* (2013.01); *H04N 2201/0084* (2013.01); *H04N 2201/0086* (2013.01); *H04N 2201/0089* (2013.01)

(56) References Cited

U.S. PATENT DOCUMENTS

| | | | |
|---|---|---|---|
| 8,482,634 B2* | 7/2013 | Kusaka et al. | 348/231.5 |
| 2003/0134648 A1* | 7/2003 | Reed et al. | 455/456 |
| 2005/0001024 A1* | 1/2005 | Kusaka et al. | 235/375 |
| 2005/0041148 A1* | 2/2005 | Bae | 348/552 |
| 2005/0270407 A1 | 12/2005 | Yamaguchi | |
| 2006/0020996 A1* | 1/2006 | Takagi et al. | 725/124 |
| 2006/0056832 A1* | 3/2006 | Yamaguchi et al. | 396/56 |
| 2008/0166966 A1* | 7/2008 | Hamasaki et al. | 455/41.2 |
| 2009/0325607 A1* | 12/2009 | Conway et al. | 455/456.3 |
| 2010/0081491 A1* | 4/2010 | Lee | 455/575.7 |
| 2010/0097483 A1 | 4/2010 | Icho et al. | |
| 2010/0141778 A1 | 6/2010 | Basson et al. | |
| 2011/0076939 A1* | 3/2011 | Sato | 455/39 |
| 2011/0273575 A1* | 11/2011 | Lee | 348/222.1 |

FOREIGN PATENT DOCUMENTS

| | | |
|---|---|---|
| JP | 2004-297422 A | 10/2004 |
| JP | 2006-025182 A | 1/2006 |
| JP | 2006-174010 A | 6/2006 |
| JP | 2008-160879 A | 7/2008 |
| JP | 2008-305043 A | 12/2008 |
| JP | 2009-094890 A | 4/2009 |
| JP | 2009-164803 A | 7/2009 |
| JP | 2010-114798 A | 5/2010 |
| JP | 4479386 B2 | 6/2010 |
| WO | 2005/043270 A2 | 5/2005 |
| WO | 2008/061810 A1 | 5/2008 |
| WO | 2009/068089 A1 | 6/2009 |

OTHER PUBLICATIONS

International Search Report, mailing date of Jul. 17, 2012, issued in related application No. PCT/JP2012/065035 (2 pages).
Office Action dated Feb. 3, 2015, issued in co-pending U.S. Appl. No. 14/096,677 (18 pages).
Extended European Search Report dated Feb. 16, 2015, issued in European Patent Application No. 12802333.0 (6 pages).

* cited by examiner

FIG. 5

| EMISSION ANGLE(°) | IDENTIFICATION INFORMATION | RECEPTION STRENGTH(dB) | |
|---|---|---|---|
| 90 | NONE | −100 | ∼ 5g |
| ⋮ | ⋮ | ⋮ | |
| 62 | ID3 | −25 | ∼ 5a |
| 61 | ID3 | −15 | ∼ 5b |
| 60 | ID3 | −40 | ∼ 5c |
| 59 | NONE | −100 | |
| ⋮ | ⋮ | ⋮ | |
| 0 | NONE | −100 | |
| ⋮ | ⋮ | ⋮ | |
| −72 | ID2 | −51 | ∼ 5d |
| −73 | ID2 | −40 | ∼ 5e |
| −74 | ID2 | −50 | ∼ 5f |
| −75 | NONE | −100 | |
| ⋮ | ⋮ | ⋮ | |
| −90 | NONE | 100 | |

US 9,092,049 B2

IMAGING APPARATUS AND WIRELESS SYSTEM

This application is a continuation application based on a PCT Patent Application No. PCT/JP2012/064750, filed on Jun. 8, 2012, whose priority is claimed on Japanese Patent Application No. 2011-140830, filed on Jun. 24, 2011. The contents of both the PCT Application and the Japanese Applications are incorporated herein by reference.

TECHNICAL FIELD

The present invention relates to an imaging apparatus and a wireless system.

BACKGROUND ART

There are wireless systems capable of switching a combination of a plurality of wireless terminals to be connected to each other between the wireless terminals that perform transmission and reception of image information or the like. For example, Japanese Patent (Granted) Publication No. 3441422 discloses a system that searches for wireless terminals by using an imaging apparatus having a GUI (graphical user interface) function in which a display device such as a liquid crystal display (LCD) panel and an input device such as a touch panel are combined with each other, displays a search result thereof on the display device of the imaging apparatus, and switches connection between the wireless terminals on the basis of an operator's instruction to be input through the touch panel or the like.

SUMMARY OF THE INVENTION

According to a first aspect of the present invention, an imaging apparatus of the present invention includes an imaging unit that captures an image; a display unit that displays the image; an antenna that is disposed at a predetermined position with respect to the imaging unit; an antenna control unit that controls directionality of the antenna by changing a maximum gain direction of the antenna; a wireless unit that transmits searching data to one or more wireless terminals through the antenna, receives response data for the searching data, and transmits control data; a reception strength detection unit that detects reception strength of the response data; an identification information extraction unit that extracts identification information of the wireless terminal which is a transmission source of the response data; a recording control unit that performs control for generating data sets in which the identification information, the reception strength, and the maximum gain direction are associated with each other; a recording unit that records the data sets; a relative angle extraction unit that extracts the maximum gain direction of the data set having a relatively larger reception strength than other reception strengths among the data sets, having the same identification information, which are recorded in the recording unit, as a relative angle indicating a relative direction of the wireless terminal based on the imaging apparatus; an estimated position calculation unit that calculates an estimated position of the wireless terminal on the image which is displayed on the display unit, on the basis of an angle of view of the display unit and the relative angle; a display control unit that controls the display unit to display the image and to display terminal information for specifying the wireless terminal corresponding to the identification information so as to be superimposed on the estimated position; an instruction input detection unit that detects an operator's instruction regarding wireless connection between a plurality of the wireless terminals, by detecting an operator's instruction for selecting the terminal information that is displayed on the display unit; and a wireless connection switching control unit that performs control for transmitting the control data regarding wireless connection to at least one wireless terminal, on the basis of the operator's instruction that is detected by the instruction input detection unit.

According to a second aspect of the present invention, in the imaging apparatus according to the first aspect, the antenna may be an array antenna that is comprised by a plurality of antenna elements, and the antenna control unit may control directionality by changing a phase of a signal to be applied to the antenna element.

According to a third aspect of the present invention, a wireless system may include the imaging apparatus according to the first aspect, and the plurality of wireless terminals that perform switching of connection between the wireless terminals, on the basis of the control data that is received from the imaging apparatus.

According to a fourth aspect of the present invention, the wireless system according to the third aspect, the wireless terminal may perform wireless connection with another wireless terminal and wireless connection with the imaging apparatus by using the same antenna and wireless unit.

BRIEF DESCRIPTION OF THE DRAWINGS

FIG. 5 is a conceptual diagram illustrating an example of a table that is recorded in a recording unit according to the first embodiment of the present invention;

DETAILED DESCRIPTION OF THE INVENTION

First Embodiment

Hereinafter, a first embodiment of the present invention will be described with reference to the drawings.

Figure 1:
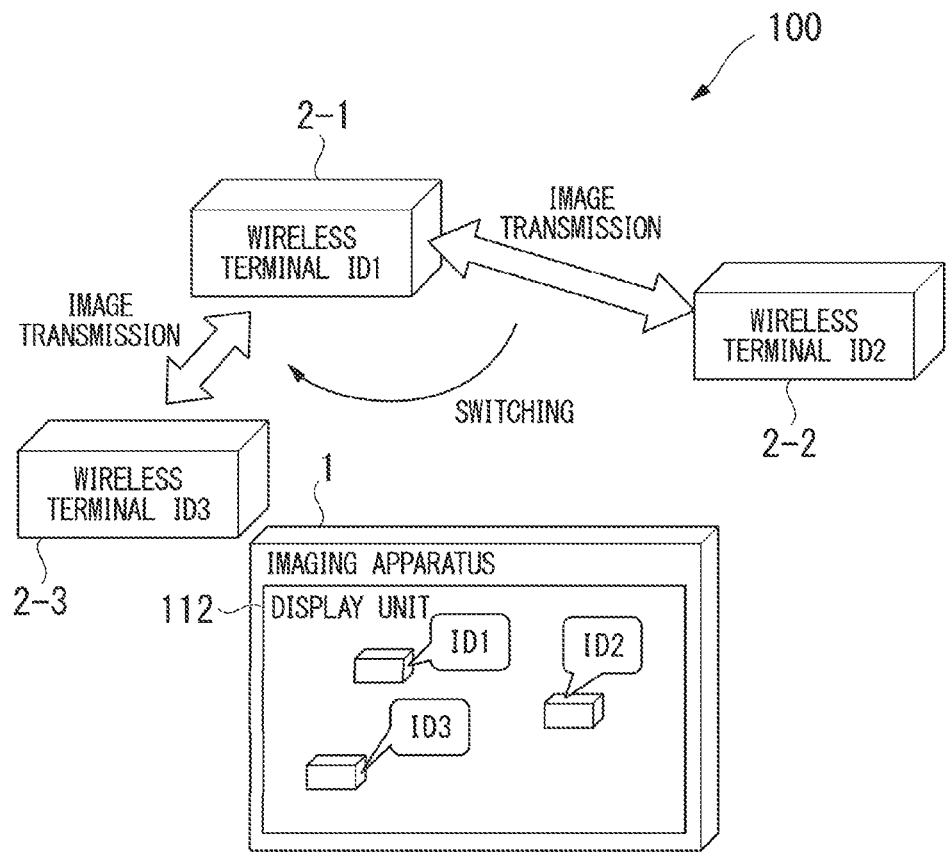
FIG. 1 is a conceptual diagram illustrating a wireless system according to a first embodiment of the present invention.

FIG. 1 is a conceptual diagram illustrating a wireless system according to a first embodiment of the present invention. In the example shown in the drawing, a wireless system 100 includes an imaging apparatus 1 and three wireless terminals 2-1, 2-2, and 2-3. Unique IDs (ID1 to ID3) for identifying the wireless terminal thereof are allocated to the wireless terminals 2-1 to 2-3, respectively. A display unit 112 included in the imaging apparatus 1 displays an image indicating the arrangement of the wireless terminals 2-1 to 2-3, which are imaged by the imaging apparatus 1, in a real space. In addition to this, identification information, which is comprised by any one of a unique ID, a simple ID, a name, and a type of each wireless terminal or a combination thereof, is displayed on the display unit 112 of the imaging apparatus 1, in association with the vicinity of an image of each of the imaged wireless terminals 2-1 to 2-3.

In FIG. 1, the ID1 to the ID3, which are identification information, are displayed in association with the wireless terminals 2-1 to 2-3, respectively. FIG. 1 shows an example in which wireless connection is switched so that when the wireless terminal 2-1 (for example, a liquid crystal television) and the wireless terminal 2-2 (for example, a DVD player 1) are wirelessly connected to each other and image information is transmitted from the wireless terminal 2-2 to the wireless terminal 2-1, the wireless terminal 2-1 and the wireless terminal 2-2 are disconnected from each other and the wireless terminal 2-1 and the wireless terminal 2-3 are connected to each other. At this time, the display unit 112 simultaneously displays the identification information of the wireless terminals 2-1 to 2-3 rather than displaying only actual positions of the wireless terminals 2-1 to 2-3.

Figure 2:
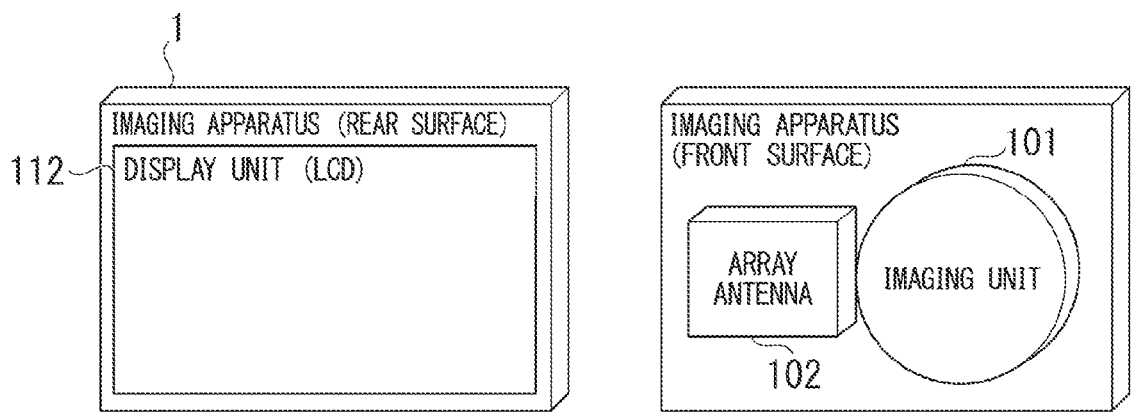
FIG. 2 is a diagram illustrating an appearance of an imaging apparatus according to the first embodiment of the present invention.

FIG. 2 is a diagram illustrating an appearance of the imaging apparatus according to the first embodiment of the present invention. In the example shown in the drawing, the imaging apparatus 1 includes an imaging unit 101, an array antenna 102, and a display unit 112. The imaging unit 101 and the array antenna 102 are disposed on a front surface of the imaging apparatus 1 so as to be adjacent to each other. The display unit 112 is disposed on a rear surface of the imaging apparatus 1.

The imaging unit 101 includes a lens (not shown) that collects light, and an imaging element such as a CCD or a CMOS sensor (not shown) that converts a subject image formed by the lens into an electrical signal. The array antenna 102 is comprised by a plurality of antenna elements (not shown) which are arranged in a two-dimensional direction. The display unit 112 is a display device that is comprised by an LCD, an organic EL, or the like.

Figure 3:
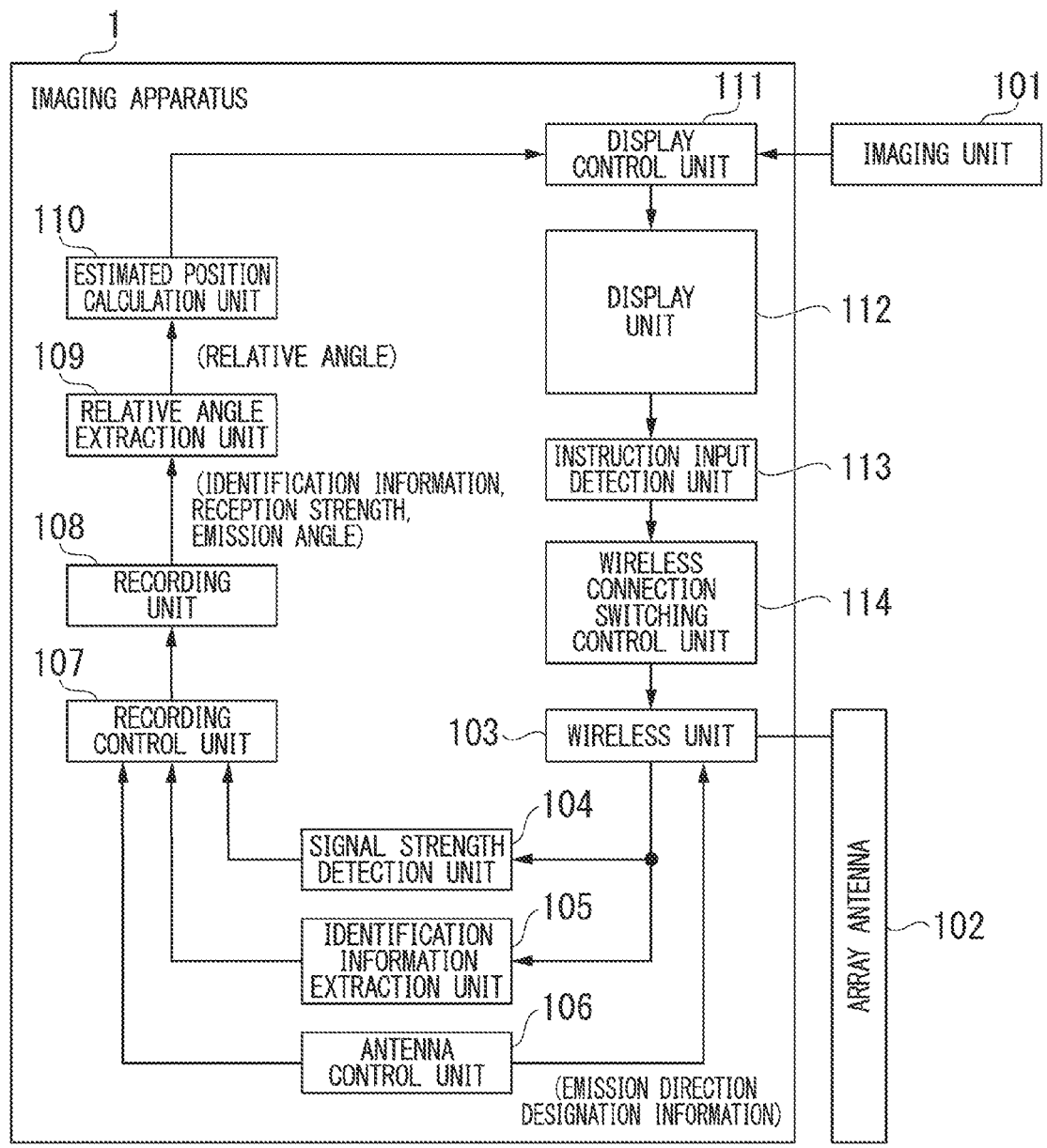
FIG. 3 is a block diagram illustrating a configuration of the imaging apparatus according to the first embodiment of the present invention.

FIG. 3 is a block diagram illustrating a configuration of the imaging apparatus 1. In the example shown in the drawing, the imaging apparatus 1 includes the imaging unit 101, the array antenna 102, a wireless unit 103, a signal strength detection unit 104, an identification information extraction unit 105, an antenna control unit 106, a recording control unit 107, a recording unit 108, a relative angle extraction unit 109, an estimated position calculation unit 110, a display control unit 111, the display unit 112, an instruction input detection unit 113, and a wireless connection switching control unit 114.

The imaging unit 101 outputs image information indicating an image, which is imaged by the imaging element, to the display control unit 111. The array antenna 102 (antenna) can control a phase of a signal to be output to each of the plurality of antenna elements (not shown) so as to transmit and receive a radio wave having directionality at an emission angle (a maximum gain direction) of the radio wave that is emitted from the antenna. In addition, the array antenna 102 can change the phase of the signal to be output to each of the plurality of antenna elements so as to change the emission angle of the radio wave. In this specification, the emission angle of the array antenna 102 is defined as follows. That is, with respect to each of a horizontal direction and a vertical direction, a direction perpendicular to an emission surface of the array antenna 102 is defined as 0 degrees and directions parallel to the array antenna 102 are defined as +90 degrees (for example, the left side) and −90 degrees (for example, the right side), respectively. An RF (radio frequency) signal is input to the array antenna 102 from the wireless unit 103. The antenna control unit 106 outputs emission direction designation information for designating an emission direction of the antenna to the wireless unit 103. The wireless unit 103 converts the emission direction designation information into an amount of deviation of the phase of the signal to be output to each of the plurality of antenna elements (not shown), and outputs the amount of deviation to the array antenna 102. The array antenna 102 transmits the radio wave toward the emission direction. In addition, the array antenna 102 outputs the received RF signal to the wireless unit 103.

The wireless unit 103 converts a connection control packet for instructing switching of connection between the wireless terminals, which is input from the wireless connection switching control unit 114, into an RF signal. The wireless unit 103 generates a searching packet (search data) for searching for the wireless terminals, and converts the generated searching packet into an RF signal.

When the wireless terminals 2-1, 2-2, and 2-3 shown in FIG. 1 receive the searching packet, the wireless terminals generate a response packet (response data) indicating that data communication is possible, then modulate and transmit the response packet. In the imaging apparatus 1, the array antenna 102 receives the modulated response packet, and the wireless unit 103 demodulates the response packet.

An RF signal in which inputs from the plurality of antenna elements of the array antenna 102 before the demodulation are synthesized is input to the signal strength detection unit 104 from the wireless unit 103. The signal strength detection unit 104 detects signal strength of the input RF signal. When signal strength output information indicating that the signal strength is output from the recording control unit 107 is input to the signal strength detection unit 104, the signal strength detection unit 104 outputs signal strength information indicating the signal strength to the recording control unit 107. The response packet after the demodulation is input to the identification information extraction unit 105 from the wireless unit 103. The response packet includes identification information of the wireless terminal that transmits the response packet. The identification information extraction unit 105 extracts the identification information included in the response packet. When identification information output information indicating that the identification information is output from the recording control unit 107 is input to the identification information extraction unit 105, the identification information extraction unit outputs the identification information to the recording control unit 107.

The antenna control unit 106 changes a phase of a signal that is added to each antenna element of the array antenna 102 so as to control the directionality (control a maximum gain direction, that is, control an emission angle) of the array antenna 102. The antenna control unit 106 outputs emission angle designation information for designating the emission direction of the array antenna 102 to the wireless unit 103. The antenna control unit 106 controls the emission angle of the array antenna 102 to be changed in a two-dimensional direction. The antenna control unit 106 performs control for changing the emission angle of the array antenna 102 so as to cover the whole area (searching area) of a viewing angle at which the imaging unit 101 captures an image. When the antenna control unit 106 terminates the change in emission angle in all directions within the searching area, the antenna control unit outputs searching termination information indicating that the change in emission angle in all directions within the searching area is terminated, to the recording control unit 107. When emission angle output information indicating that the emission angle of the array antenna 102 is output is input to the antenna control unit 106 from the recording control unit 107, the antenna control unit outputs emission direction information indicating the emission direction to the recording control unit 107.

When information to be recorded in the recording unit 108 is input to the recording control unit 107, the recording control unit records the input information in the recording unit 108. The recording control unit 107 outputs the signal strength output information to the signal strength detection unit 104. The signal strength information is input to the recording control unit 107 from the signal strength detection unit 104 in response to the signal strength output information. The recording control unit 107 outputs the identification information output information to the identification information extraction unit 105. The identification information is input to the recording control unit 107 from the identification information extraction unit 105 in response to the identification information output information. The recording control unit 107 outputs the emission angle output information to the antenna control unit 106. The emission direction information is input to the recording control unit 107 from the antenna control unit 106 in response to the emission angle output information. The recording control unit 107 writes the signal strength information, the identification information, and the emission direction information in the recording unit 108. When the searching termination information is input to the recording control unit 107 from the antenna control unit 106, the recording control unit outputs the searching termination information to the relative angle extraction unit 109 through the recording unit 108.

The recording unit 108 is comprised by a volatile memory, a non-volatile memory, a hard disk or the like. These can be selected in accordance with the shape of a device, a way to use, an environment, or the like. The recording unit 108 records a measurement table that is configured by data sets in which the signal strength information, the identification information, and the emission angle information are associated with each other. The signal strength information, the identification information, and the emission angle information which are recorded in the recording unit 108 are read out from the relative angle extraction unit 109. The recording unit 108 outputs the searching termination information, which is input from the recording control unit 107, to the relative angle extraction unit 109. A type of the measurement table recorded in the recording unit 108 will be described below in detail with reference to the drawings.

When the searching termination information is input to the relative angle extraction unit 109 from the recording unit 108, the relative angle extraction unit extracts a relative angle. The relative angle extraction unit 109 selects data sets having the same identification information from the measurement table recorded in the recording unit 108. The relative angle extraction unit 109 extracts an emission angle of a data set having the maximum signal strength among the selected data sets, and extracts the emission angle as a relative angle of the wireless terminal having the identification information. The relative angle extraction unit 109 outputs relative angle information indicating the extracted relative angle and the identification information to the estimated position calculation unit 110. The extraction of the relative angle which is performed by the relative angle extraction unit 109 will be described below in detail with reference to the drawings.

The estimated position calculation unit 110 calculates a display position (estimated position) of the identification information of the wireless terminal which is displayed on the display unit 112, on the basis of the relative angle that is input from the relative angle extraction unit 109, an angle of view of the imaging unit 101, a number of pixels of the display unit 112, and the like. The estimated position calculation unit 110 outputs display position information indicating the calculated display position of the identification information of the wireless terminal to the display control unit 111 in association with the identification information. The calculation of the display position of the identification information of the wireless terminal which is performed by the estimated position calculation unit 110 will be described below in detail with reference to the drawings.

Image information of an appearance of each of the wireless terminals, which are imaged by the imaging unit 101, is input to the display control unit 111. The display control unit 111 generates the identification information itself that is input from the estimated position calculation unit 110, or an identification image that is diagramed or abstracted so that an operator easily understands the identification information. The display control unit 111 generates display information in which the generated identification image is superimposed on the display position, which is indicated by the display position information input from the estimated position calculation unit 110, of an image indicated by the image information. The display control unit 111 outputs the generated display information to the display unit 112. When the display information is input to the display unit 112 from the display control unit 111, the display unit displays an image indicated by the display information on a display surface thereof.

The instruction input detection unit 113 is configured by a touch panel that is provided in the display unit 112, or a switch such as a jog dial switch for selecting a cursor or the like. The instruction input detection unit 113 detects that an operator has selected an image of the wireless terminal, which is displayed on the display unit 112, or the identification information that is displayed in the vicinity (referred to as a selection area) of the image. When the operator establishes anew the connection from the wireless terminal 2-2 to the wireless terminal 2-1, for example, the operator first selects a selection area of the wireless terminal 2-2 and then selects a selection area of the wireless terminal 2-1. Based on this operation, the instruction input detection unit 113 detects that the operator has selected the connection from the wireless terminal 2-2 to the wireless terminal 2-1. In this example, the instruction input detection unit 113 outputs selection information indicating the connection from the wireless terminal 2-2 to the wireless terminal 2-1, to the wireless connection switching control unit 114. The wireless connection switching control unit 114 disconnects wireless connection between the wireless terminals on the basis of the selection information that is input from the instruction input detection unit 113, generates a connection control packet (control data) indicating that a new wireless connection is established, and outputs the generated connection control packet to the wireless unit 103.

Figure 4:
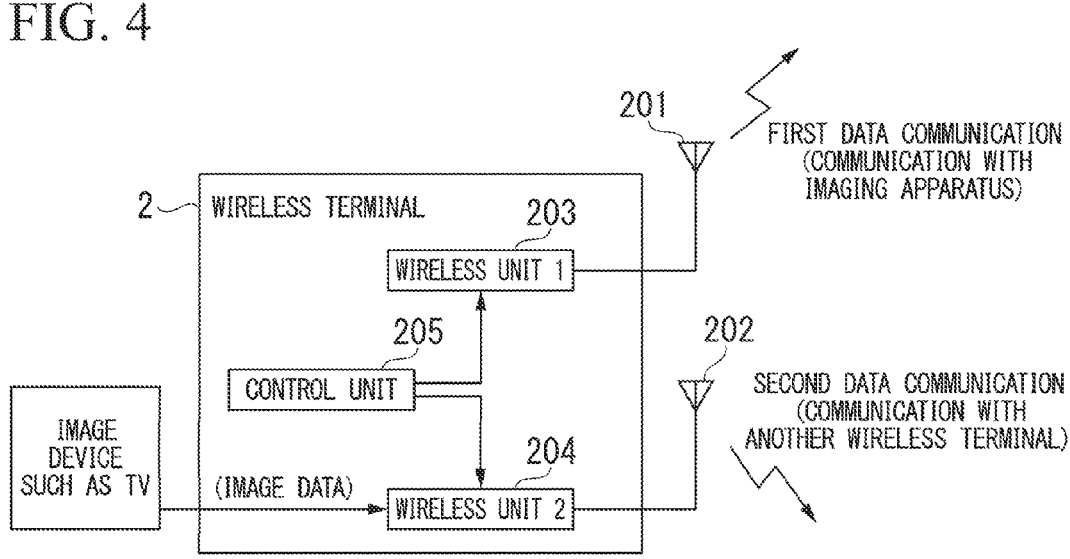
FIG. 4 is a block diagram illustrating a configuration of a wireless terminal according to the first embodiment of the present invention.

FIG. 4 is a block diagram illustrating a configuration of a wireless terminal 2 according to the first embodiment of the present invention. In the example shown in the drawing, the wireless terminal 2 includes an imaging-device antenna 201, a wireless-terminal antenna 202, an imaging-device wireless unit 203, a wireless-terminal wireless unit 204, and a control unit 205. The imaging-device antenna 201 transmits an RF signal that is input from the imaging-device wireless unit 203, as a radio wave toward the imaging apparatus 1. The imaging-device antenna 201 receives a radio wave that is transmitted from the imaging apparatus 1. The imaging-device antenna 201 outputs an RF signal corresponding to the received radio wave to the imaging-device wireless unit 203. The wireless-terminal antenna 202 transmits an RF signal that is input from the wireless-terminal wireless unit 204 as a radio wave toward an another wireless terminal 2. The wireless-terminal antenna 202 receives a radio wave that is transmitted from the another wireless terminal 2. The wireless-terminal antenna 202 outputs an RF signal corresponding to the received radio wave to the wireless-terminal wireless unit 204.

When an RF signal is input to the imaging-device wireless unit 203 from the imaging-device antenna 201, the imaging-device wireless unit converts the input RF signal into a baseband signal, and outputs the converted baseband signal to the control unit 205. The imaging-device wireless unit 203 converts the baseband signal that is input from the control unit 205 into an RF signal, and outputs the converted RF signal to the imaging-device antenna 201. When an RF signal is input to the wireless-terminal wireless unit 204 from the wireless-terminal antenna 202, the wireless-terminal wireless unit converts the input RF signal into a baseband signal, and outputs the converted baseband signal to the control unit 205. The wireless-terminal wireless unit 204 converts the baseband signal that is input from the control unit 205 into an RF signal, and outputs the converted RF signal to the wireless-terminal antenna 202.

When a searching packet is input to the control unit 205 from the imaging-device wireless unit 203, the control unit outputs a response packet added with ID information of the wireless terminal 2 to the wireless-terminal wireless unit 204. A connection control packet for instructing switching of connection between the wireless terminals is input to the control unit 205 from the wireless-terminal wireless unit 204. The control unit 205 establishes connection with the another wireless terminal indicated by the connection control packet by outputting a connection request packet for requesting connection or a disconnect request packet for requesting disconnection to the wireless-terminal wireless unit 204, in response to the instruction for connection which is indicated by the connection control packet. After the establishment of connection, the control unit 205 transmits image data between an image device, such as a TV or a DVD player, which is connected to the control unit 205, and the wireless-terminal wireless unit 204.

FIG. 5 is a conceptual diagram illustrating an example of the measurement table that is recorded in the recording unit 108. As shown in the drawing, the measurement table has rows of items including emission direction information, identification information, and reception strength information. The measurement table is two-dimensional tabulated data that is configured by rows and columns in which identification information and reception strength are stored for each emission angle. A data set 5a indicates that the emission angle is 62 degrees, the identification information is ID3, and the reception strength is −25 dB. A data set 5b indicates that the emission angle is 61 degrees, the identification information is ID3, and the reception strength is −15 dB. A data set 5c indicates that the emission angle is 60 degrees, the identification information is ID3, and the reception strength is −40 dB. The relative angle extraction unit 109 compares the reception strength of the data sets 5a to 5c having the same identification information, and selects the data set 5b indicating the maximum reception strength. The relative angle extraction unit 109 determines that a relative angle of the wireless terminal 2-3 having an ID3 is 61 degrees on the left side of the antenna, on the basis of the emission angle of the selected data set 5b.

In addition, a data set 5d indicates that the emission angle is −72 degrees, the identification information is ID2, and the reception strength is −51 dB. A data set 5e indicates that the emission angle is −73 degrees, the identification information is ID2, and the reception strength information is −40 dB. A data set 5f indicates that the emission angle is −74 degrees, the identification information is ID2, and the reception strength is −50 dB. The relative angle extraction unit 109 compares the reception strength of the data sets 5d to 5f, and selects the data set 5e indicating the maximum reception strength. The relative angle extraction unit 109 determines that the relative angle of the wireless terminal 2-3 having an ID3 is 73 degrees on the left side of the antenna, on the basis of the emission angle of the selected data set 5e. A data set 5g indicates that the emission angle is 90 degrees, the identification information is not present, and the reception strength is −100 dB. A data set 5g indicates that the reception strength of an RF signal, which is received in the array antenna 102 from a direction of the emission angle of 90 degrees, is lower than reception critical strength (herein, −100 dB), which is the detectable lowest strength of the RF signal, and that the identification information cannot be specified.

Figure 6:
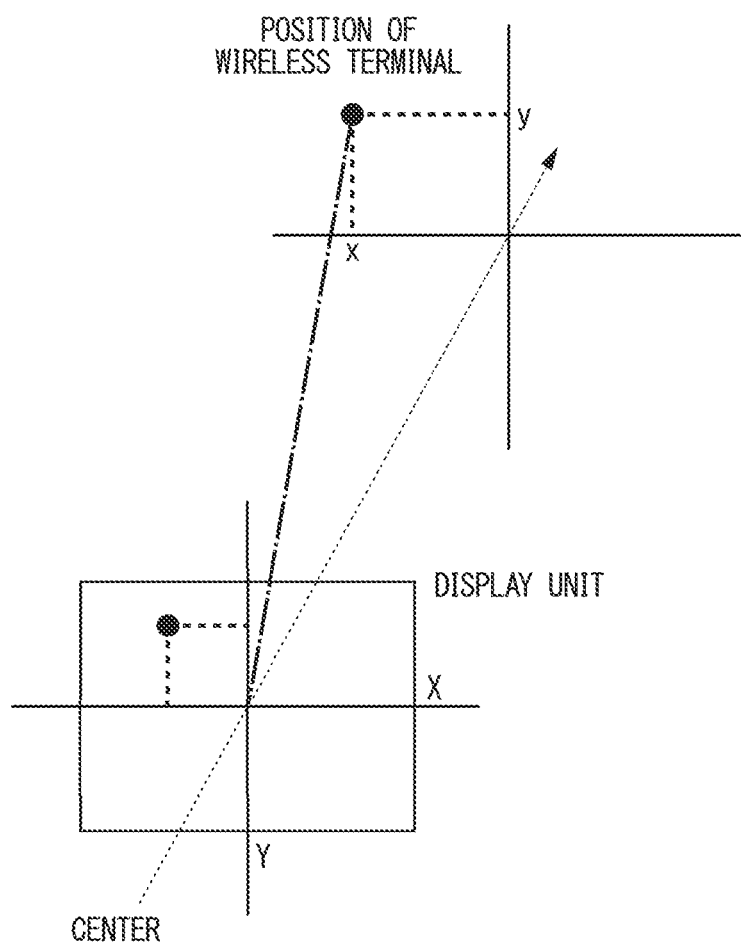
FIG. 6 is a conceptual diagram illustrating a relationship between display positions of a wireless terminal image and identification information according to the first embodiment of the present invention.

FIG. 6 is a conceptual diagram illustrating the wireless terminal 2 to be imaged, and a relationship between display positions of an image of the wireless terminal and identification information which are displayed on the display unit 112. A position (estimated position) at which the display unit 112 displays the identification information on the display surface thereof is determined in accordance with a coordinate of a two-dimensional space between a horizontal (X) direction and an elevation angle (Y) direction. It is actually impossible to cause imaging centers of the array antenna 102 and the imaging unit 101 to be completely consistent with each other (see FIG. 1). However, since a distance between the center of the array antenna 102 and the center of the imaging unit 101 is sufficiently smaller than a distance between the imaging apparatus and the wireless terminal, the inconsistency between the center of the array antenna 102 and the center of the imaging unit 101 is negligible in most cases. Herein, a case where the inconsistency between the center of the array antenna 102 and the center of the imaging unit 101 is negligible will be described. At this time, the calculations of the estimated positions in the horizontal (X) direction and the elevation angle (Y) direction are independently performed, and can be considered similarly. Thus, only the horizontal (X) direction will be described below, and the elevation angle (Y) direction will not be described.

Figure 7:
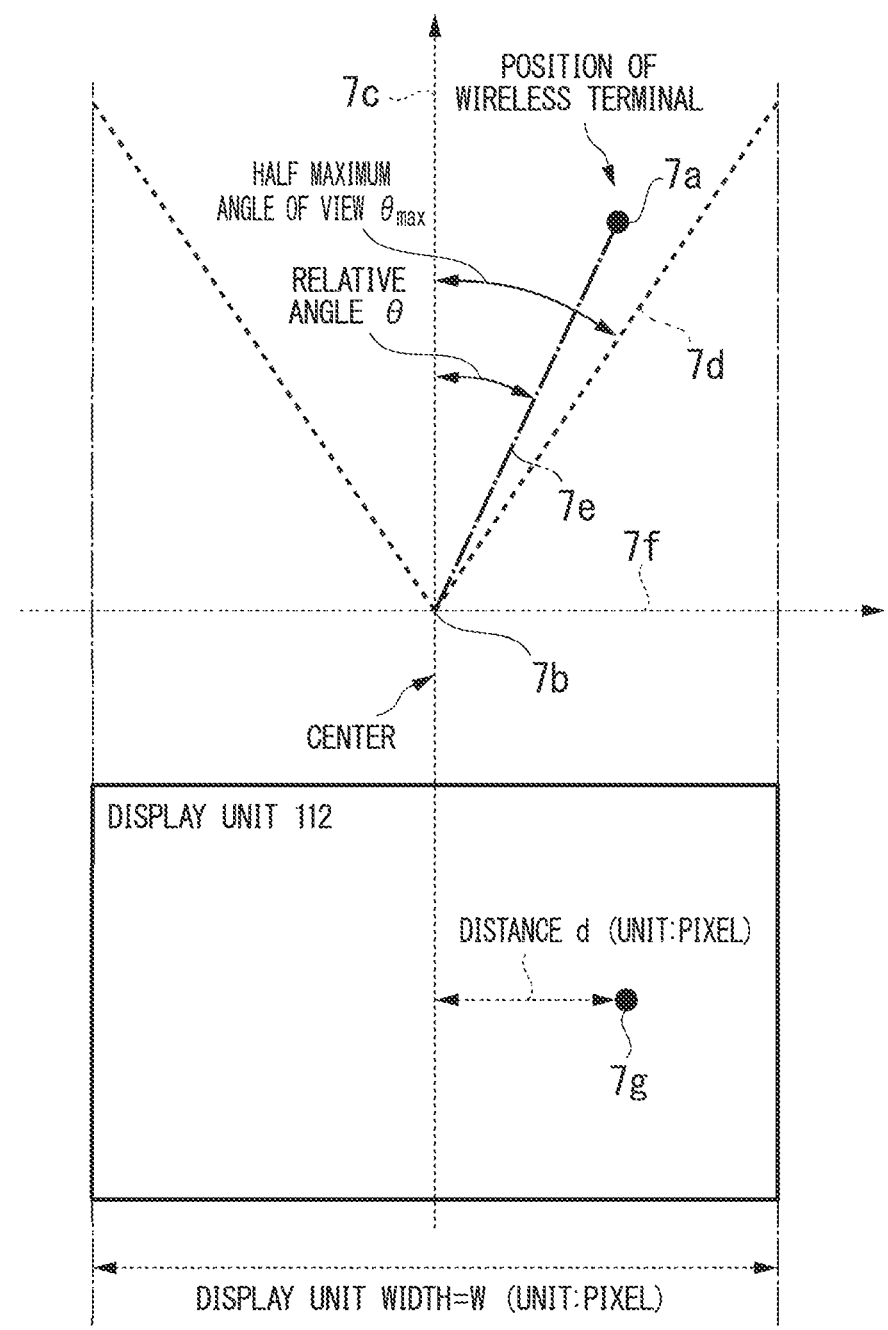
FIG. 7 is a diagram illustrating a relationship between the position of the wireless terminal and the display position of the identification information according to the first embodiment of the present invention.

FIG. 7 is a diagram illustrating a position of a wireless terminal within a horizontal plane in a real space and a display position of identification information of the wireless terminal which is displayed on the display unit 112. A dot 7a represents a position at which the wireless terminal is actually present. In FIG. 7, simply, an optical axis (central axis) of the imaging unit 101, the center of the array antenna 102, and the center of the display unit 112 are marked on the same axis from the premise that the inconsistency between the center of the array antenna 102 and the center of the imaging unit 101 is negligible. A dot 7b represents the centers of the imaging unit 101 and the array antenna 102. A broken line 7c represents an optical axis (central axis) of the imaging unit 101, and represents a direction (a direction having an emission angle of 0 degrees) perpendicular to an emission surface of the array antenna 102, which is superimposed on the optical axis. A broken line 7d represents a maximum angle of view of the display unit 112. A broken line 7e represents a line connecting the centers of the imaging unit 101 and the array antenna 102 and the wireless terminal A broken line 7f represents a surface (a front surface of the imaging apparatus 1) which is perpendicular to the broken line 7c. A dot 7g represents display points of the wireless terminal and the identification information which are displayed on the display unit 112. The display unit showing the dot 7g is simply shown as a front view of the display unit in order to facilitate the understanding.

A resolution in a width direction (horizontal direction) of the display unit 112 is set to W (a unit is a pixel), and a distance between the center of the display unit 112 and an estimated position of the wireless terminal to be displayed on the display unit 112 is set to d (a unit is a pixel). Here, it is assumed that an image including an appearance of each of the wireless terminals imaged by the imaging unit 101 is displayed using all width W pixels of the display unit. When items (for example, a menu) other than the captured image are displayed in a peripheral portion or the like of the display unit, the W may be set by subtracting the number of pixels of the peripheral portion from the all width W pixels.

The center of an angle of view of the display unit 112 and the center of a viewing angle of the imaging unit 101 are set to be consistent with each other (dot 7c), and the angle of view and the viewing angle are set to be bilaterally symmetrical to each other from the centers thereof. When half the maximum angle of view (an angle between the broken line 7c and the broken line 7d) is set to θmax and a relative angle (an angle between the broken line 7c and the broken line 7e) of the wireless terminal which is estimated using the array antenna 102 is set to θ, a distance d is expressed by Equation (1).

$$d = \frac{\sin\theta}{\sin\theta_{max}} * \frac{W}{2} \quad (1)$$

Here, the W denotes the number of pixels of an LCD panel of the display unit 112 in the horizontal direction, and thus the W is a constant when the LCD panel is determined. The θmax having a value of half the maximum angle of view is also a constant that is unique to an imaging system. Therefore, when the relative angle θ is determined, the distance d, that is, the estimated position can be determined Detection of Position of Wireless Terminal The antenna control unit 106 outputs emission direction designation information to the array antenna 102. The array antenna 102 transmits a searching packet to a wireless terminal toward an emission direction indicated by the emission direction designation information. When the wireless terminal receives the searching packet, the wireless terminal transmits a response packet to the imaging apparatus 1. The recording control unit 107 acquires signal strength information from the signal strength detection unit 104, then acquires identification information from the identification information extraction unit 105, then acquires the emission direction designation information from the antenna control unit 106, and writes the acquired pieces of information in the recording unit 108.

Calculation of Estimated Position

The relative angle extraction unit 109 extracts a relative angle on the basis of a measurement table recorded in the recording unit 108. The relative angle extraction unit 109 outputs relative angle information indicating the extracted relative angle and identification information to the estimated position calculation unit 110. The estimated position calculation unit 110 calculates the distance d indicating the estimated position by substituting the relative angle indicated by the relative angle information, which is input from the relative angle extraction unit 109, the W, and the θmax into Expression (1).

Display

The display control unit 111 displays an image including an appearance of each of the wireless terminals 2 that are imaged by the imaging unit 101 on the display unit 112. Furthermore, the display control unit 111 displays the identification information itself, which is input from the recording unit 108, or the identification information that is diagramed or abstracted so as to be easily understood by an operator, as additional information, on the display unit 112 by being superimposed on the estimated position that is calculated by the estimated position calculation unit 110. Since the estimated position indicates a position of the wireless terminal, the additional information is displayed in the vicinity of the wireless terminal 2 on the image.

Switching of Connection Between Wireless Terminals

The wireless terminal 2 has a first data communication function for responding to a searching packet from the imaging apparatus 1, and a second data communication function for communicating data, which includes an image or the like having a much larger data volume than data communication with the imaging apparatus 1, between the wireless terminals 2. In addition, it is desired to be capable of freely changing combinations, directions, and the like of the wireless terminals 2 performing the second data communication. For example, a case is considered where the wireless terminal 2-1 illustrated in FIG. 2 is connected to a liquid crystal display, the wireless terminal 2-2 is connected to a DVD player A, and the wireless terminal 2-3 is connected to another DVD player B. When the imaging apparatus 1 switches an opponent of the wireless connection between them through the second data communication function, the imaging apparatus is positioned as a control unit that is mounted on a multifunctional remote controller for switching the connection between the wireless terminals 2.

Herein, as an example, description will be given of the switching of connection in a case where the transmission of a moving image being performed between the wireless terminal 2-1 having an ID1 and the wireless terminal 2-3 having an ID3 is changed to the transmission of the moving image being performed between the wireless terminal 2-1 having an ID1 and the wireless terminal 2-2 having an ID2.

The display unit 112 displays an image of each of the wireless terminals imaged by the imaging unit 101, and displays additional information in the vicinity of the position of the wireless terminal on the image. The instruction input detection unit 113 detects an instruction for causing an operator to select additional information of the wireless terminal 2-2 or the vicinity thereof, and generates information (selection information) indicating the selected additional information. The instruction input detection unit 113 outputs the selection information to the wireless connection switching control unit 114. When the selection information is input to the wireless connection switching control unit 114, the wireless connection switching control unit determines that the wireless terminal 2-2 corresponding to the additional information has been selected. The wireless connection switching control unit 114 transmits a connection control packet for instructing the wireless terminal 2-1 to be disconnected from the wireless terminal 2-3 and to establish connection with the wireless terminal 2-2, to the wireless terminal 2-1 through the wireless unit 103 and the array antenna 102.

The imaging-device antenna 201 of the wireless terminal 2-1 receives a connection control packet. The connection control packet is input to the control unit 205 of the wireless terminal 2-1 through the imaging-device wireless unit 203. The control unit 205 of the wireless terminal 2-1 outputs a disconnect request packet toward the wireless terminal 2-3 to the wireless-terminal antenna 202 through the wireless-terminal wireless unit 204. The wireless-terminal antenna 202 of the wireless terminal 2-1 transmits the disconnect request packet toward the wireless terminal 2-3. The wireless-terminal antenna 202 of the wireless terminal 2-3 receives the disconnect request packet from the wireless terminal 2-1. The disconnect request packet is input to the control unit 205 of the wireless terminal 2-3 through the wireless-terminal wireless unit 204. The control unit 205 of the wireless terminal 2-3 stops the output of moving image data, which is input from an image device or the like, to the wireless-terminal wireless unit 204.

On the other hand, the control unit 205 of the wireless terminal 2-1 transmits a connection request packet toward the wireless terminal 2-2 through the wireless-terminal wireless unit 204 and the wireless-terminal antenna 202. The wireless-terminal antenna 202 of the wireless terminal 2-2 receives the connection request packet. The connection request packet is input to the control unit 205 of the wireless terminal 2-2 through the wireless-terminal wireless unit 204. The control unit 205 of the wireless terminal 2-2 outputs moving image data, which is input from an image device or the like, to the wireless-terminal wireless unit 204, and starts the transmission of the moving image data through the wireless-terminal antenna 202.

Based on a series of the operations, in the wireless system 100, an instruction for switching of wireless connection between the wireless terminals 2 is input to the imaging apparatus 1, and combinations and directions of the transmission/reception of the second data communication between the wireless terminals 2 are switched in response to the instruction.

According to the present embodiment of the present invention, the wireless terminal 2 transmits a response packet to the imaging apparatus 1 in response to a searching packet that is transmitted from the array antenna 102. The array antenna 102 changes an emission angle of the searching packet so as to cover the whole area of a viewing angle of the imaging unit 101. The signal strength detection unit 104 measures reception strength of the response packet. The relative angle extraction unit 109 calculates a relative angle of the wireless terminal 2 on the basis of the reception strength. The estimated position calculation unit 110 calculates an estimated position on the basis of the relative angle of the wireless terminal 2. The display control unit 111 causes the display unit 112 to display an image, which is imaged by the imaging unit 101, and identification information on the estimated position. The instruction input detection unit 113 detects a wireless switching instruction from the operator. The wireless connection switching control unit 114 transmits a connection control packet to the wireless terminal 2 in accordance with the wireless switching instruction. The wireless terminal 2 switches connection between the wireless terminals in accordance with information indicated by the connection control packet.

Therefore, in this embodiment, since identification information and additional information such as an icon are displayed in the vicinity of an actual wireless terminal on the display unit, an operator easily ascertains a property and details of the wireless terminal and selects the identification information and the icon by using a touch panel or the like, and thus the operator can easily input an instruction for switching wireless connection.

In the above-mentioned configuration, the antenna control unit 106, the recording control unit 107, and the display control unit 111 are configured as separate blocks, but may be configured to be integrated into, for example, a single control unit.

In the above description, a case where a viewing angle of an imaging system is constant has been described, but even in a case where the viewing angle of the imaging system is changed like zooming, the viewing angle can be converted from a setting value of zooming, and an estimated position can be determined using Equation (1). For example, the viewing angle may be obtained in accordance with a setting magnification of zooming by recording a relationship between a magnification of the zooming and the viewing angle in the recording unit 108 in advance and referring to the relationship. In this case, as a matter of course, a range in which an emission angle of an array antenna is changed has to cover the viewing angle after the change in zooming.

A range of an angle in which the array antenna 102 searches for the wireless terminal 2 while changing the emission direction thereof is required to be equal to or greater than the viewing angle of the imaging unit 101. When the range of an angle in which the array antenna 102 searches for the wireless terminal 2 is smaller than the viewing angle of the imaging unit 101, a dead area, which is an area where additional information cannot be displayed, may be generated.

Equation (1) is established on the basis that a scanning center direction of the array antenna 102 and an imaging center direction of the imaging unit 101 are the same as each other, but when the directions are different from each other due to circumstances of arrangement, a difference therebetween may be corrected.

According to the first embodiment of the present invention, an example in which the display unit 112 is disposed on a rear surface of the imaging unit 101 is shown, but is not limited thereto. The display unit may be disposed anywhere as long as the hand or body of an operator does not interrupt the fields of view of the imaging unit 101 and the array antenna 102. In addition, the display unit may be configured to be movable by using a hinge or the like.

Emission direction information that is stored in a measurement table may not necessarily correspond to a maximum gain direction, and may be a value that is close to the maximum gain direction.

It is desired that the frequency of updating of the measurement table is frequency in which the updating can follow a speed at which a field of view of the imaging apparatus is changed and a speed at which the wireless terminal moves within an angle of view.

When an image including an appearance of each of the wireless terminals imaged by the imaging unit 101 is displayed, a moving image of from 25 frames/seconds to 60 frames/seconds or more may be displayed as in an ordinary video camera, or an image when a release is pushed may be displayed as in a still camera. As a matter of course, it is not preferable because displaying of a moving image requires a larger power consumption, which results in an increase in size of a battery of an imaging terminal. Therefore, a decision may be actually made by determining a trade-off between a display change frequency and power consumption. In addition, high-speed scanning is allowed by using a high-speed data transmission wireless system using millimeter waves or the like. Thus, even though an imaging apparatus freely moves with the operator's hand, it is possible to allow displaying of additional information to follow the movement.

Second Embodiment

Hereinafter, a second embodiment of the present invention will be described in detail with reference to the drawings. According to the above-mentioned first embodiment of the present invention, a case has been described where the wireless terminal 2 includes the imaging-device antenna 201 that performs communication with the imaging apparatus 1 and the wireless-terminal antenna 202 that performs communication between the wireless terminals 2. In the second embodiment of the present invention, a case will be described where the wireless terminal 2 performs communication with the imaging apparatus 1 and performs communication between the wireless terminals 2 by using one common antenna. The imaging apparatus 1 according to this embodiment is configured in the same manner as the imaging apparatus 1 of the first embodiment, and thus a description thereof will not be repeated.

Figure 8:
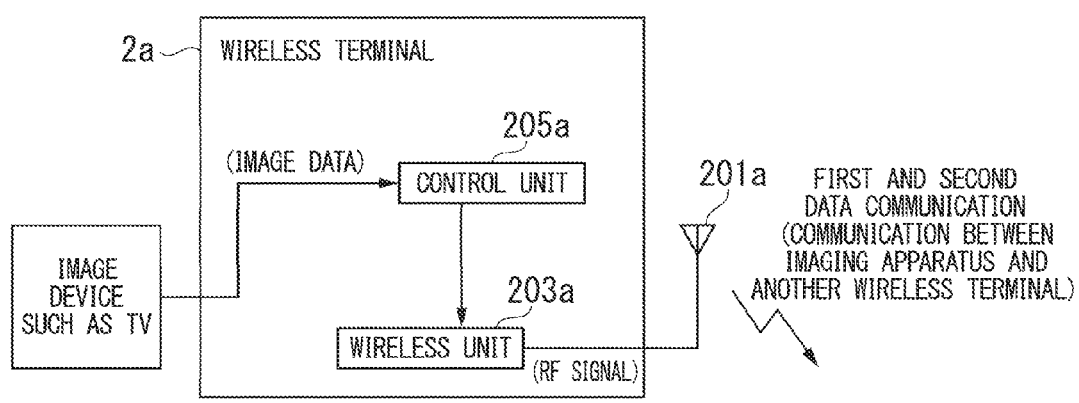
FIG. 8 is a block diagram illustrating a configuration of a wireless terminal according to a second embodiment of the present invention.
Figure 9:
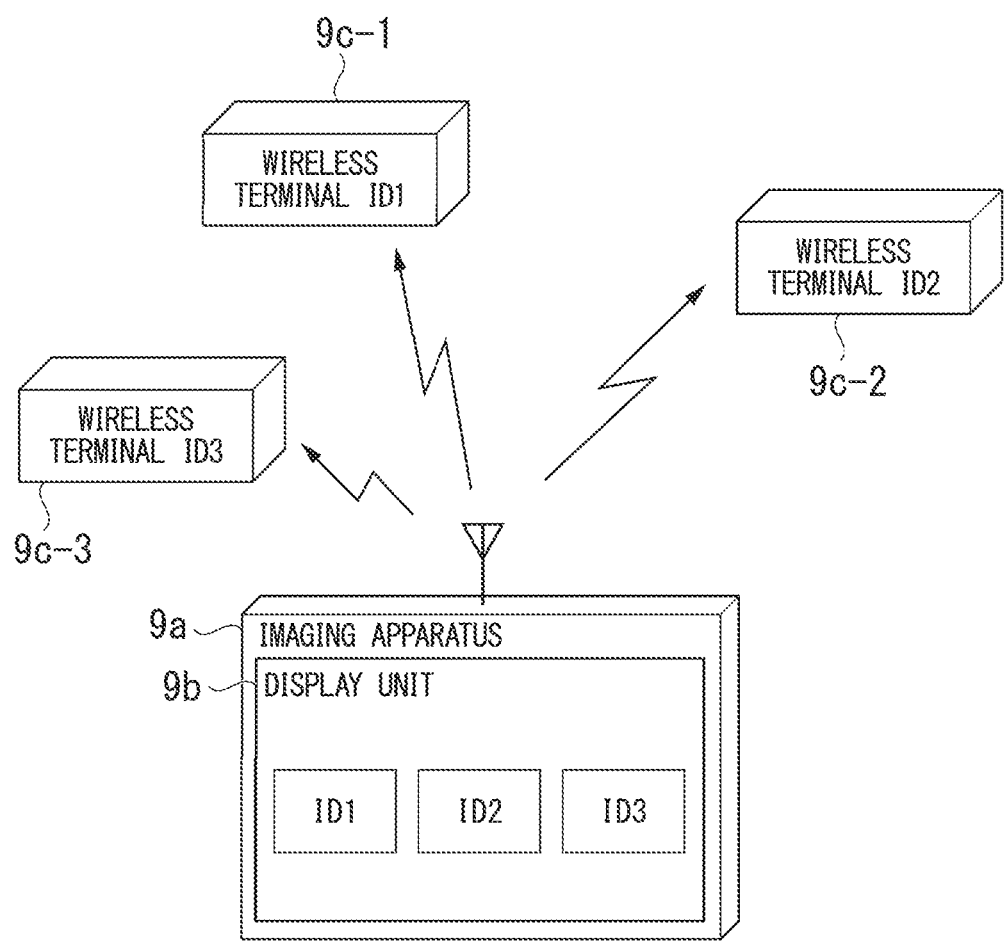
FIG. 9 is a diagram illustrating an example of the prior art.

FIG. 8 is a block diagram illustrating a configuration of a wireless terminal 2a according to the second embodiment of the present invention. In the example shown in the drawing, the wireless terminal 2a includes an antenna 201a, a wireless unit 203a, and a control unit 205a. The antenna 201a is used for both communication with the imaging apparatus 1 and communication with another wireless terminal 2a by which data transmission that is larger than this is performed. The antenna 201a transmits an RF signal, which is input from the wireless unit 203a, as a radio wave toward the imaging apparatus 1 and another wireless terminal 2a. The antenna 201a receives a radio wave from the imaging apparatus 1 and another wireless terminal 2a. The antenna 201a outputs an RF signal corresponding to the received radio wave to the wireless unit 203a.

When the RF signal is input to the wireless unit 203a from the antenna 201a, the wireless unit converts the input RF signal into a baseband signal, and outputs the converted baseband signal to the control unit 205a. The wireless unit 203a converts the baseband signal, which is input from the control unit 205a, into an RF signal, and outputs the converted RF signal to the antenna 201a. When a searching packet is input to the control unit 205a from the wireless unit 203a, the control unit outputs a response packet added with ID information of the wireless terminal 2a to the wireless unit 203a. A connection control packet for instructing switching of connection between the wireless terminals is input to the control unit 205a from the wireless unit 203a. The control unit 205a outputs a connection request packet for requesting connection or a disconnect request packet for requesting disconnection to the wireless unit 203a in accordance with the instruction for connection which is indicated by the connection control packet, thereby establishing connection with another wireless terminal which is indicated by the connection control packet. After the establishment of connection, the control unit 205a performs transmission of image data between an image device, such as a TV or a DVD player, which is connected to the control unit 205a, and the wireless unit 203a.

Herein, as an example, description will be given of the switching of connection in a case where the transmission of a moving image being performed between a wireless terminal 2a-1 having an ID1 and a wireless terminal 2a-3 having an ID3 is changed to the transmission of the moving image being performed between wireless terminal 2a-1 having an ID1 and a wireless terminal 2a-2 having an ID2.

The display unit 112 displays an image of each of the wireless terminals imaged by the imaging unit 101, and displays additional information in the vicinity of the position of the wireless terminal on the image. The instruction input detection unit 113 detects an instruction for causing an operator to select additional information of the wireless terminal 2a-2 or the vicinity thereof, generates information (selection information) indicating the selected additional information, and outputs the generated information to the wireless connection switching control unit 114. When the selection information is input to the wireless connection switching control unit 114, the wireless connection switching control unit determines that the wireless terminal 2a-2 corresponding to the additional information is selected. The wireless connection switching control unit 114 transmits a connection control packet for instructing the wireless terminal 2a-1 to be disconnected from wireless terminal 2a-3 and to establish connection with the wireless terminal 2a-2, to the wireless terminal 2a-1 through the wireless unit 103 and the array antenna 102.

The antenna 201a of the wireless terminal 2a-1 receives the connection control packet. The connection control packet is input to the control unit 205a of the wireless terminal 2a-1 through the wireless unit 203a. The control unit 205a of the wireless terminal 2a-1 outputs a disconnect request packet toward the wireless terminal 2a-3 to the antenna 201a through the wireless unit 203a. The antenna 201a of the wireless terminal 2a-1 transmits the disconnect request packet toward the wireless terminal 2a-3. The antenna 201a of the wireless terminal 2a-3 receives the disconnect request packet. The disconnect request packet is input to the control unit 205a of the wireless terminal 2a-3 through the wireless unit 203a. The control unit 205a of the wireless terminal 2a-3 stops the output of moving image data, which is input from an image device or the like, to the wireless unit 203a.

On the other hand, the control unit 205a of the wireless terminal 2a-1 transmits a connection request packet toward the wireless terminal 2a-2 through the wireless unit 203a and the antenna 201a. The antenna 201a of the wireless terminal 2a-2 receives the connection request packet. The connection request packet is input to the control unit 205a of the wireless terminal 2a-2 through the wireless unit 203a. The control unit 205a of the wireless terminal 2a-2 outputs moving image data, which is input from an image device or the like, to the wireless unit 203a, and starts the transmission of the moving image data through the antenna 201a.

According to the second embodiment of the present invention, the wireless terminal 2a performs communication with the imaging apparatus 1 and another wireless terminal 2a by using the same antenna 201a. Thus, when switching of communication between wireless terminals is performed through wireless communication from an external control device (imaging apparatus), a wireless unit exclusively for communication switching is not required to be provided on the wireless terminal side, and thus the cost and size can be reduced.

In the above-mentioned each embodiments, an antenna including a mechanism capable of mechanically changing directionality in a horizontal direction and an elevation angle direction may be used instead of the array antenna 102.

In a case where an array antenna is used, as a higher radio frequency is used in a wireless unit, the antenna is likely to be reduced in size. For example, when millimeter waves of about 60 GHz are used, it is possible to realize miniaturization by disposing the antenna on an IC chip.

As described above, the embodiments of the present invention have been described in detail with reference to the drawings. However, the specific configurations are not limited thereto, and various changes may be made without departing from the scope of the invention.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An imaging apparatus comprising:
an imaging unit that captures an image;
a display unit that displays the image;
an antenna that is disposed at a predetermined position with respect to the imaging unit;
an antenna control unit that controls directionality of the antenna by changing a maximum gain direction of the antenna;
a wireless unit that transmits searching data to one or more wireless terminals through the antenna, receives response data for the searching data, and transmits control data;
a reception strength detection unit that detects reception strength of the response data;
an identification information extraction unit that extracts identification information of the wireless terminal which is a transmission source of the response data;
a recording control unit that performs control for generating data sets in which the identification information, the reception strength, and the maximum gain direction are associated with each other;
a recording unit that records the data sets;
a relative angle extraction unit that extracts the maximum gain direction of the data set having a relatively larger reception strength than other reception strengths among the data sets, having the same identification information, which are recorded in the recording unit, as a relative angle indicating a relative direction of the wireless terminal based on the imaging apparatus;
an estimated position calculation unit that calculates an estimated position of the wireless terminal on the image which is displayed on the display unit, on the basis of an angle of view of the display unit and the relative angle;
a display control unit that controls the display unit to display the image and to display terminal information for specifying the wireless terminal corresponding to the identification information so as to be superimposed on the estimated position;
an instruction input detection unit that detects an operator's instruction regarding wireless connection between a plurality of the wireless terminals, by detecting an operator's instruction for selecting the terminal information that is displayed on the display unit; and
a wireless connection switching control unit that performs control for transmitting the control data regarding wireless connection to at least one wireless terminal, on the basis of the operator's instruction that is detected by the instruction input detection unit.

2. The imaging apparatus according to claim 1,
wherein the antenna is an array antenna that is configured by a plurality of antenna elements, and
wherein the antenna control unit controls directionality by changing a phase of a signal to be applied to the antenna element.

3. A wireless system comprising:
the imaging apparatus according to claim 1; and
the plurality of wireless terminals that perform switching of connection between the wireless terminals, on the basis of the control data that is received from the imaging apparatus.

4. The wireless system according to claim 3, wherein the wireless terminal performs wireless connection with another wireless terminal and wireless connection with the imaging apparatus by using the same antenna and wireless unit.

* * * * *